United States Patent [19]

Parrish

[11] Patent Number: 5,141,531
[45] Date of Patent: Aug. 25, 1992

[54] WATER PURIFICATION METHOD

[75] Inventor: Clyde F. Parrish, Melbourne, Fla.

[73] Assignee: Mainstream Engineering, Inc., Rockledge, Fla.

[21] Appl. No.: 669,582

[22] Filed: Mar. 14, 1991

[51] Int. Cl.$^5$ .............................. B01D 53/04
[52] U.S. Cl. ........................... 55/33; 55/35; 55/179
[58] Field of Search ............ 55/33, 35, 179, 208, 55/281

[56] References Cited

U.S. PATENT DOCUMENTS

| | | | |
|---|---|---|---|
| 2,203,144 | 6/1940 | Hammond | 55/33 |
| 3,355,860 | 12/1967 | Arnoldi | 55/33 |
| 3,400,515 | 9/1968 | Ackerman | 55/33 |
| 3,629,995 | 12/1971 | Moten | 55/33 |
| 3,728,844 | 4/1973 | Snyder | 55/33 |
| 4,146,372 | 3/1979 | Groth et al. | 55/33 |
| 4,219,341 | 8/1980 | Hussmann | 55/179 |
| 4,285,702 | 8/1981 | Michel et al. | 55/33 |
| 4,342,569 | 8/1982 | Hussmann | 55/33 |

Primary Examiner—Charles Hart
Attorney, Agent, or Firm—Evenson, Wands, Edwards, Lenahan & McKeown

[57] ABSTRACT

A water purification and/or collection method uses a water-specific reaction with an anhydrous salt to separate organic and inorganic contaminants in a water supply. A stream of water vapor containing the contaminates is passed over a desiccant bed of anhydrous salt. Only the water in the stream reacts to form hydrates while the contaminates pass by in an air stream for disposal elsewhere. The fully hydrated bed is then regenerated by heat to free the purified water which is condensed.

3 Claims, 1 Drawing Sheet

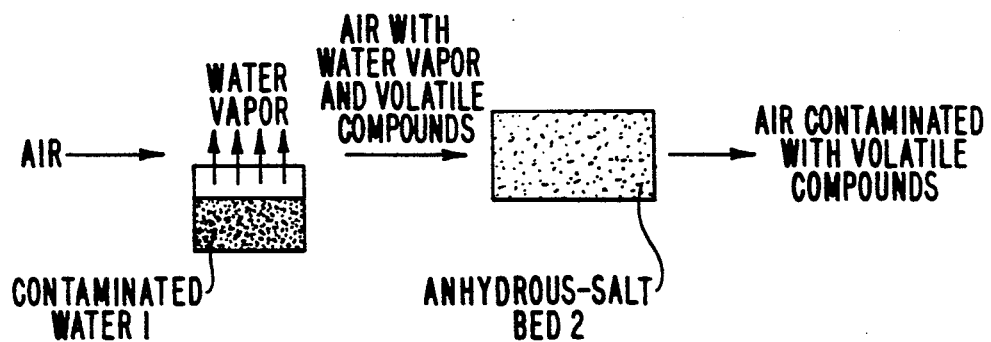
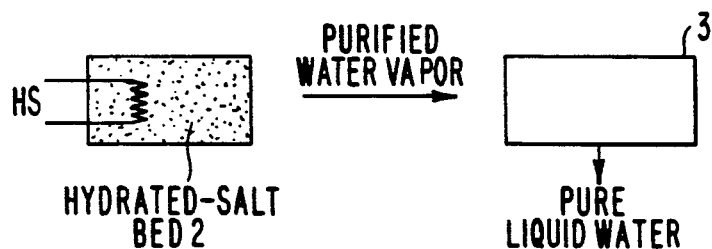
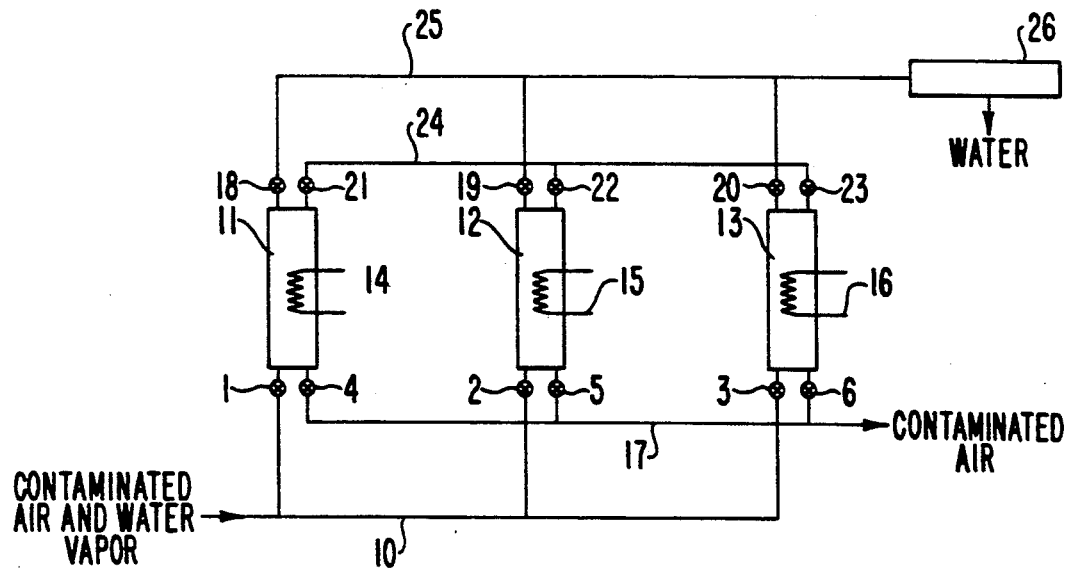

WATER PURIFICATION METHOD

BACKGROUND AND SUMMARY OF THE INVENTION

The present invention relates to a method for water purification with a water-specific reaction, and, more particularly, to a method and apparatus for purification of water contaminated by organic and/or inorganic compounds (petroleum; nuclear, biological, chemical (NBC) agents; and other volatile compounds) by trapping water in an anhydrous salt and then isolating water by decomposing the hydrate and condensing the purified water vapor while, at the same time, regenerating the desiccant.

In the past, it was known that water could be extracted from the atmosphere by using physical adsorbents such as silica gel or molecular sieves which are inert and have been used with no reported hazards. Practical apparatus can be constructed for extracting 200 gallons of water per hour at 80° F. and 10% relative humidity. Higher relative humidities yield higher water production, e.g. 700 gallons per hour at 40% RH and 80° F.; 1000 gallons per hour at 55% RH and 80° F. It was not, however, considered that such devices could be used for water purification.

Several methods are also known to remove water from the atmosphere. These include the use of refrigeration cycles and the passing of water vapor through a membrane. The most energy-efficient technique is, however, to use a desiccant to adsorb the water from the atmosphere, which would then be recycled to release the water and regenerate the desiccant. Known water purification methods depend on the quantity and nature of the contaminant. For example, if the level of contamination was more than that of treatment for microorganisms, such as chlorination, then some form of separation was used. Most known methods used for liquid-phase water purification require that the contaminant be removed from water. This type of separation of the impurity has been effected by filtration, adsorption, coagulation and sedimentation, or ion-exchange.

Water which has been contaminated by volatile compounds is difficult to purify by conventional methods such as distillation, reverse osmosis or ultrafiltration. Adsorbents might be used to remove petroleum or other contaminants from water but they have limited selectivity and limited capacity. Therefore, the use of activated carbon or similar adsorbents to remove gross contamination would not be practical. Distillation will not separate a volatile component from water, since both would distill. Reverse osmosis and ultrafiltration will also have difficulty in removing petroleum or other volatile contaminants. None of these conventional methods would be effective for NBC (nuclear, biological or chemical) contamination.

Using an adsorption principle, however, with a water-specific reaction, the present invention permits effective and efficient water purification by using air saturated with water vapor from the contaminated water source. Only water from the vapor stream is extracted by the desiccant. Contaminates in the water vapor pass through the system without reacting with a desiccant in the form of an anhydrous salt; pure water is obtained by dehydration while the air stream containing the contaminates exits the system.

In carrying out this purification process, a presently contemplated embodiment of the present invention utilizes a desiccant bed comprised of a suitable anhydrous salt to effect water extraction at low relative humidities. A suitable salt must have a rate of adsorption which is much higher than other desiccants, must be non-toxic and should be recyclable many times.

Another aspect of the system in accordance with the present invention is that it can operate at the minimum relative humidity and stay within the weight and size limitations with the use of a low pressure blower (i.e. about 20 inches of water pressure). Typically, such a blower powered by a Diesel engine will have a capacity of 150,000 CFM. This blower will be incorporated in a system having a weight of 14,500 lbs (not including desiccant), a desiccant consisting of anhydrous salt, a desiccant bed area of 75 ft$^2$ and a 1 hour cycle period.

As is well known, the water content of air is a function of temperature. As the temperature increases, the amount of water that air can hold increases. Relative humidity is the ratio of the quantity of water in air to the maximum quantity of water air can hold at a given temperature. Therefore, if the air temperature is increased, the total amount of water in air at a fixed relative humidity would be increased. The size of the system is controlled by the weight and size limitations of the hardware, but the amount of water that can be held by the system is determined by the quantity of the desiccant in the adsorption bed. The limits on collection for the high relative humidities would be the size of the bed, energy available, and recycle time.

Thus, it has been found possible to construct a water collection device that will produce purified water by separating volatile organic and inorganic contaminants at 200 gal/hr from air with a relative humidity of 10% and 80° F. It would require two of these units to produce purified water at 200 gal/hr and 5% RH at 80° F. If the relative humidity is raised to 40% and 80° F., the volume of purified water collected per hour will increase to 750 gallons, and at 55% RH and 80° F. the collection rate would be 1000 gal/hr. The system has the additional advantage of being simple, rugged and self-contained.

The following hydrates have been identified as particularly suitable for the water purification apparatus and method of the present invention based on low toxicity, low dehydration temperature, and high percent of water in the hydrated salt: cupric sulfate pentahydrate; sodium acetate trihydrate; cadmium sulfate octahydrate; ferrous sulfate heptahydrate; cobalt chloride hexahydrate; aluminum sulfate octadecahydrate; and zinc sulfate heptahydrate.

For a desiccant-anhydrous salt to perform properly in the present invention, the decomposition temperature of the hydrate should be above the atmospheric boiling point of water. This would permit distillation of the water from the desiccant to a condenser at atmospheric pressure. In addition, if the desiccant loses water below the boiling point of water, then the water will dissolve part or all of the salt and thus lead to caking of the desiccant.

In a process embodying the present invention, the first step causes the contaminated water vapor to saturate the air at the inlet of the system which contains an anhydrous salt-desiccant bed. The saturated air is then forced through the bed, but only the water reacts with the salt to form a hydrate. The contaminates will pass through the system and have no interaction with the bed. The second step is to heat and decompose the hydrate by removing (condensing) the water to provide a source of purified water in a simple yet effective manner.

In one presently contemplated embodiment of a system in accordance with the present invention, three desiccant beds are used. Air is forced into a manifold where it is valved through one of the three desiccant beds. The exit air, which is dehydrated, it is passed into the second bed, which is initially hot from a previous regeneration step. This second bed is cooled for use as the next bed to hydrate. A third bed is in the process of being regenerated by distilling the trapped water through the condenser. Finally, water is collected in a receiver. At the end of this cycle, the first bed is hydrated, the second bed is cooled, and the third bed is hot but dehydrated. There are three steps in the process for hydrating and dehydrating the desiccant beds. Heat from the Diesel engine exhaust may be used to dehydrate the beds, and air-cooled condensers are used to collect the water vapor.

BRIEF DESCRIPTION OF THE DRAWINGS

These and other objects, features and advantages of the present invention will become more apparent from the following detailed description of a presently preferred embodiment thereof when taken in conjunction with the accompanying drawings wherein:

FIGS. 1A and 1B are schematics showing two basic steps of the process in accordance with the present invention; and FIG. 2 is a schematic diagram of a system using three desiccant beds with the basic process shown in FIGS. 1A and 1B.

DETAILED DESCRIPTION OF THE DRAWINGS

Referring now to FIG. 1A, a contaminated water source 1 which has been contaminated with volatile organic or inorganic compounds, is heated and mixed in the form of vapor with air supplied to a desiccant bed 2 containing anhydrous salt. The bed 2 interacts with only the water in the vapor/contaminate mixture and converts the salt to a hydrate. The remaining air which is contaminated with volatile compounds is exited from the system.

In the second basic step of the process, as shown in FIG. 1B, the hydrated salt in the bed 2 is heated by a heat source HS after the bed has been completely converted to hydrate. As a result of heating the bed 2, water vapor is removed to a condenser 3 where pure water is distilled by condensation.

In a more practical form of the system of the present invention, as shown schematically in FIG. 2, three desiccant beds 11, 12, 13, are provided each containing a heating coil 14, 15, 16. Contaminated air and water vapor flow through a supply line 10 through a first valve 1 into the first bed 11 while valves 2 and 3 are closed. A hydrate is thus formed as described above, with the contaminated air exiting from the bed through a line 24, via open valves 21, 22 to the second bed 12 while valve 23 is closed to prevent the stream from flowing from the outlet of the first desiccant bed 11 to the outlet of the third desiccant bed 13. During this part of the process, valves 4 and 6 are closed while valve 5 at the outlet of the second desiccant bed 12 is open. The air flow cools the second desiccant bed and the third desiccant bed is heated by the associated heating coil 16, while heating coils 14 and 15 are off, to decompose the hydrate that has been formed in a previous cycle and thereby regenerate the desiccant bed. Valve 20 is open to a condenser 26, while valves 18 and 19 are closed, during the heating cycle so that water vapor can pass from the dehydrated third bed 13 to the condenser 26 where the purified water is formed. The condenser 26 is joined selectively to the other two beds 11, 12 through a common line 25 and the respective valves 18, 19.

The above-described process is repeated for the next cycle in which the second desiccant bed 12 is hydrated while the third desiccant bed 13 is cooled and the first desiccant bed 11 is dehydrated. The valves 1, 2, 3, 4, 5, 6, 18, 19, 20, 21, 22 and 23 are adjusted accordingly to control the flow to effect this process as well as the third cycle in which the third bed 13 is hydrated, the second bed is dehydrated and the first bed 11 is cooled.

It will thus be appreciated that the invention avoids the problems which have been encountered with known distillation techniques which cannot separate volatile components. The present invention also provides a solution to the problem caused by the volatility of soluble components in contaminated water inasmuch as the present invention uses only the water vapor from the contaminated source. Consequently, the present invention is particularly useful with petroleum or other volatile organic contaminants, although it is also effective for NBC products as previously mentioned.

Although the invention has been described and illustrated in detail, it is to be clearly understood that the same is by way of illustration and example, and is not to be taken by way of limitation. For example, it is within the scope of the present invention to use several different types of anhydrous salts, one particular salt contemplated is magnesium sulfate. Biological agents which have been removed from the contaminated supply can be destroyed with a biocide placed in the bed or, where applicable, by the heat from the dehydration process itself. Therefore, the spirit and scope of the present invention are to be limited only by the terms of the appended claims.

What is claimed:

1. A method for recovering purified water, comprising the steps of passing a stream of contaminated air and water vapor to a non-toxic, recyclable anhydrous salt bed which retains the water and separates pure water from the contaminated air by forming a hydrated salt, discharging the contaminates with discharged air, and dehydrating the bed to recover purified water.

2. The method according to claim 1, further including the step of dehydrating a second desiccant bed during hydration of the first-mentioned bed.

3. The method according to claim 2, further including the step of cooling a third desiccant bed during the steps of hydrating the first-mentioned bed.

* * * * *